(12) United States Patent
Takahashi et al.

(10) Patent No.: US 10,069,177 B2
(45) Date of Patent: Sep. 4, 2018

(54) LITHIUM ION SECONDARY BATTERY AND CHARGING METHOD THEREFOR

(71) Applicant: NEC ENERGY DEVICES, LTD., Sagamihara-shi, Kanagawa (JP)

(72) Inventors: Hiroo Takahashi, Kanagawa (JP); Takayuki Suzuki, Kanagawa (JP)

(73) Assignee: NEC ENERGY DEVICES, LTD., Sagamihara-shi, Kanagawa (JP)

(*) Notice: Subject to any disclaimer, the term of this patent is extended or adjusted under 35 U.S.C. 154(b) by 504 days.

(21) Appl. No.: 14/766,501

(22) PCT Filed: Mar. 4, 2014

(86) PCT No.: PCT/JP2014/055349
§ 371 (c)(1),
(2) Date: Aug. 7, 2015

(87) PCT Pub. No.: WO2014/141930
PCT Pub. Date: Sep. 18, 2014

(65) Prior Publication Data
US 2015/0380777 A1  Dec. 31, 2015

(30) Foreign Application Priority Data
Mar. 14, 2013 (JP) .................................. 2013-051873

(51) Int. Cl.
*H02J 7/04* (2006.01)
*H01M 10/44* (2006.01)
(Continued)

(52) U.S. Cl.
CPC .......... *H01M 10/446* (2013.01); *H01M 4/366* (2013.01); *H01M 4/621* (2013.01);
(Continued)

(58) Field of Classification Search
CPC ............... H01M 10/44; H01M 10/446; H01M 10/0567; H01M 4/621; H02J 7/0052
(Continued)

(56) References Cited

U.S. PATENT DOCUMENTS

2004/0101756 A1   5/2004   Koyama et al.
2006/0035146 A1   2/2006   Hayashi et al.
(Continued)

FOREIGN PATENT DOCUMENTS

CN   1751405 A    3/2006
CN   102668222 A  9/2012
(Continued)

OTHER PUBLICATIONS

International Search Report for PCT/JP2014/055349 dated Jun. 17, 2014 [PCT/ISA/210].
(Continued)

*Primary Examiner* — Edward Tso
*Assistant Examiner* — Aaron Piggush
(74) *Attorney, Agent, or Firm* — Sughrue Mion, PLLC (57) ABSTRACT

A method for charging a lithium ion secondary battery including at least a positive electrode, a negative electrode provided with a negative electrode active material layer that includes carbon as a negative electrode active material, an electrolytic solution, and a sheathing material that encloses the positive electrode, the negative electrode and the electrolytic solution; the negative electrode active material layer including carboxymethyl cellulose and the electrolytic solution including an additive that can be decomposed at a predetermined voltage includes: preliminary charging including constant-current charging in which charging is performed at a fixed current value and, following the constant-current charging, constant-voltage charging in which charging is performed at a fixed voltage; degassing in which gas is removed from within the sheathing material after the preliminary charging; and main charging that follows the
(Continued)

degassing in which the lithium ion secondary battery is charged. The fixed voltage during the constant-voltage charging is at least 3.3 V per cell.

16 Claims, 2 Drawing Sheets

(51) Int. Cl.
    *H01M 10/0525*  (2010.01)
    *H01M 10/0567*  (2010.01)
    *H01M 4/36*  (2006.01)
    *H01M 4/62*  (2006.01)
    *H02J 7/00*  (2006.01)

(52) U.S. Cl.
    CPC ... *H01M 10/0525* (2013.01); *H01M 10/0567* (2013.01); *H01M 10/44* (2013.01); *H02J 7/0052* (2013.01); *H02J 7/007* (2013.01)

(58) Field of Classification Search
    USPC ............ 320/157, 162; 429/217, 231.8
    See application file for complete search history.

(56) References Cited

U.S. PATENT DOCUMENTS

| | | | | |
|---|---|---|---|---|
| 2010/0015514 | A1* | 1/2010 | Miyagi | H01M 4/131 429/129 |
| 2012/0094191 | A1 | 4/2012 | Yoon et al. | |
| 2012/0227253 | A1 | 9/2012 | Kumeuchi et al. | |
| 2013/0130113 | A1* | 5/2013 | Takano | H01M 4/131 429/223 |

FOREIGN PATENT DOCUMENTS

| | | |
|---|---|---|
| JP | 11-111339 A | 4/1999 |
| JP | 2000-277144 A | 10/2000 |
| JP | 2002-203609 A | 7/2002 |
| JP | 2004-171901 A1 | 6/2004 |
| JP | 2004-273424 A | 9/2004 |
| JP | 2006-260864 A | 9/2006 |
| JP | 2006-351332 A | 12/2006 |
| JP | 2011-54408 A | 3/2011 |
| JP | 2012-510702 A | 5/2012 |
| JP | 2013-30441 A | 2/2013 |
| WO | 2011/061999 A1 | 5/2011 |

OTHER PUBLICATIONS

Communication dated Dec. 27, 2016, from the State Intellectual Property Office of People's Republic of China in counterpart Application No. 201480014869.X.

* cited by examiner

FIG. 1A  THEORETICAL VALUE

FIG. 1B  OCCURRENCE OF DECOMPOSITION OF ADDITIVE

LITHIUM ION SECONDARY BATTERY AND CHARGING METHOD THEREFOR

CROSS REFERENCE TO RELATED APPLICATIONS

This application is a National Stage of International Application No. PCT/JP2014/055349, filed on Mar. 4, 2014, which claims priority from Japanese Patent Application No. 2013-051873, filed on Mar. 14, 2013, the contents of all of which are incorporated herein by reference in their entirety.

TECHNICAL FIELD

The present invention relates to a lithium ion secondary battery and to a method of charging the lithium ion secondary battery, and more particularly relates to a charging method adapted to a lithium ion secondary battery in which an aqueous binder is used as a binder for dispersing a negative electrode active material in an negative electrode active material layer.

BACKGROUND ART

Lithium ion secondary batteries that use a carbon material as a negative electrode active material, that use a lithium-containing composite oxide as positive electrode active material, and that use as an electrolytic solution an aprotic solvent to which an electrolyte has been added have been receiving attention as power sources for use in portable telephones or notebook personal computers due to their ability to realize high-energy density. An electrolyte that is added to an electrolytic solution is also referred to as a supporting electrolyte. The negative electrode of a lithium ion secondary battery is formed by taking a simple substance carbon powder such as graphite or amorphous carbon as the negative electrode active material, forming a slurry in which this simple substance carbon powder is dispersed in a binder and an organic solvent then added, applying this slurry to a collector formed from, for example, metal plates, and then removing the organic solvent by vaporization. A material such as polyvinylidene difluoride (PVDF) is conventionally used as the binder.

However, when a lithium ion secondary battery is initially charged after assembly, gas forms within the electrolytic solution and a protective film with lithium ion conductivity referred to as a SEI (Solid Electrolyte Interphase) film forms on the negative electrode surface. Gas remaining inside the cell causes degradation of the characteristics, and the occurrence of gas can interfere with the formation of a uniform protective film. If a stable protective film is not formed, the capacity of the battery is greatly reduced with repeated charging and discharging.

In JP H11-111339A [PL1], disclosed is a matter of forming a film while suppressing the generation of gas by maintaining a pressurized state inside the battery when initially charging the lithium ion secondary battery, and after charging the battery to the charge completion voltage, releasing the pressurized state and then sealing the opening in the battery receptacle while under normal pressure or reduced pressure. JP 2000-277144A [PL2] discloses inserting battery elements in an aluminum-laminated bag, infusing an non-aqueous electrolyte solution and then sealing the bag opening, followed by charging until a predetermined battery voltage is generated to complete the initial generation of gas, then carrying out a charging process for only a necessary amount of electricity, holding this charged state as is in a high-temperature environment for a necessary time interval to cause generation of gas from the electricity-generating elements, opening a portion of the bag in the hot environment to exhaust the gas that has accumulated inside, and then resealing the bag.

In the initial charging of the lithium ion secondary battery, a widely followed procedure includes first implementing a preliminary charging step of carrying out preliminary charging to produce gas inside the cell; then implementing a degassing step of opening the outer sheathing material of the cell to exhaust gas to the exterior, resealing the outer sheathing, and then implementing a main charging step of charging up to the prescribed fully charged voltage.

In a lithium ion secondary battery, constant-current constant-voltage charging is typically used as the charging method both because excessive voltage and over-charging must be strictly avoided and because voltage of terminals increases with increasing charging capacity. In constant-current constant-voltage charging, constant-current charging is first carried out at a prescribed current value while the voltage of cell terminals is monitored, and when the terminal voltage reaches the set voltage, constant-voltage charging is carried out at the set voltage. Even when initial charging is carried out by executing the preliminary charging step, degassing step, and main charging step, constant-voltage constant-current charging is typically carried out for each of the preliminary charging step and main charging step.

Regarding the protective film on the surface of the negative electrode, JP 2002-203609A [PL3] discloses the provision of a step of forming a protective film on the surface of the negative electrode by carrying out constant-current charging and then carrying out constant-voltage charging to cause a decomposition reaction in the non-aqueous solvent of a non-aqueous electrolyte, and a step of carrying out charging for absorbing lithium into the negative electrode.

In order to form a stabilized protective film that is formed on the negative electrode surface and positive electrode surface in a lithium ion secondary battery, processes have been proposed in which an additive that can be decomposed by a predetermined voltage is added to an aprotic electrolyte solution, following which the protective film is formed by a decomposition reaction of the additive at the time of initial charging. JP 2006-351332A [PL4] discloses adding a chain disulfonate ester to an electrolytic solution and then carrying out charging in a temperature range of 30 to 60° C. JP 2011-054408A [PL5] discloses carrying out constant-current constant-voltage charging in which the set voltage is 3.8 to 4.1 V in a lithium ion secondary battery that uses an electrolytic solution that contains fluorinated cyclic carbonate as an additive, followed by degassing.

CITATION LIST

Patent Literatures

[PL1]: JP H11-111339A
[PL2]: JP 2000-277144A
[PL3]: JP 2002-203609A
[PL4]: JP 2006-351332A
[PL5]: JP 2011-054408A
[PL6]: WO2011/061999

SUMMARY OF THE INVENTION

Problem to be Solved by the Invention

In the above-described [PL1] to [PL5], the charging conditions in the initial charging of a lithium ion secondary battery are investigated. However, these investigations are limited to the use of PVDF or the like as the binder in the negative electrode active material layer. As a binder, PVDF satisfies necessary properties of an electrode such as strength and chemical stability, but necessitates the use of an organic solvent such as N-methyl-2-pyrrolidone (NMP) as a solvent when adjusting the slurry. In recent years, in the interest of environmental compatibility or to avoid exposure to organic solvent, binders known as aqueous binders have come to be applied for the negative electrodes of lithium ion secondary electrodes. An aqueous binder is, for example, styrene-butadiene copolymer rubber (SBR). Slurry is realized by dispersing the SBR in water together with carbon powder, which is the negative electrode active material. The negative electrode active material layer is formed by applying this slurry to the negative electrode collector and then drying. An aqueous binder is characterized by being dispersed in water together with the negative electrode active material to form slurry, but in actuality, the combined use of a thickener is necessary for adjusting the viscosity of the slurry. Carboxymethyl cellulose (CMC), which is a water-soluble polymer, is typically used as a thickener. Accordingly, a negative electrode active material layer that uses an aqueous binder is substantially specified by the presence of CMC.

While PVDF effects planar adhesion, an aqueous binder exhibits a point-type adhesive behavior, and the amount of binder is therefore typically less than for PVDF. In addition, the inventors found through experimentation that taking carbon as the negative electrode active material and using a substance having greater specific surface area as measured by the BET (Brunauer-Emmett-Teller) method increases electrode strength. If the specific surface area of the negative electrode active material is great, or if the amount of binder is limited, the reaction area between the negative electrode active material and electrolytic solution also increases, with the result that reaction speed is also increased, and to this extent, the formation of an SEI film (protective film) at lower voltage and smaller integrated current (i.e., capacity) can be expected. Accordingly, it can be anticipated that the use of an aqueous binder enables a reduction of the voltage value and current value at the time of preliminary charging.

However, according to the investigation by the inventors, sufficient battery performance could not be obtained in a lithium ion secondary battery that has a negative electrode active material layer that uses an aqueous binder when, as the charging conditions of initial charging, equal or lower current/voltage conditions were used than for a lithium ion secondary battery that has a negative electrode active material layer that uses PVDF as a binder. For example, it was found that a precipitate occurred on the surface of the negative electrode active material layer, and this precipitate interfered with the electrode reaction on the negative electrode. According to the results of analysis by XPS (X-ray Photoelectron Spectroscopy), this precipitate contained lithium and sulfur and was therefore inferred to be material created by a reaction with lithium that was intercalated on the negative electrode with an additive having a sulfonyl group. It was further recognized that there was a marked reduction of the battery capacity after repetition of charging and discharging cycles. This reduction is thought to result from the occurrence of the precipitate that hinders the electrode reaction of the negative electrode, and further, suggests that the formation of the SEI film (protective film) is insufficient. Accordingly, the charging conditions of initial charging must be reexamined for a lithium ion secondary battery that uses an aqueous binder for the negative electrode active material layer.

Based on the disparity described above that occurs between using PVDF and using an aqueous binder as a binder, there is a possibility that the optimum material may differ depending on the type of binder regarding the properties and conditions of carbon that is used in the negative electrode active material, but this investigation remains to be carried out.

It is an exemplary object of the present invention to provide a charging method that is suited to the initial charging of a lithium ion secondary battery that uses an aqueous binder for the negative electrode active material layer and that thus solves the above-described problem.

It is another exemplary object of the present invention to provide a lithium ion secondary battery that uses an aqueous binder for the negative electrode active material layer, and further, in which initial charging is carried out by an appropriate charging method.

Means for Solving the Problem

According to a first aspect of the present invention, the charging method of a lithium ion secondary battery is a charging method of a lithium ion secondary battery that comprises at least a positive electrode, a negative electrode that is provided with a negative electrode active material layer that contains carbon as a negative electrode active material, an electrolytic solution, and a sheathing material that encapsulates the positive electrode, the negative electrode and the electrolytic solution; wherein the negative electrode active material layer contains carboxymethyl cellulose and the electrolytic solution contains an additive that can be decomposed at a predetermined voltage; the charging method comprising: preliminary charging that includes constant-current charging in which charging is carried out at a fixed current and constant-voltage charging that follows the constant-current charging and in which charging is carried out at a fixed voltage; degassing that extracts gas from the interior of the sheathing material following the preliminary charging; and main charging step of charging the lithium ion secondary battery after the degassing; wherein the fixed voltage in the constant-voltage charging is at least 3.3 V per cell.

According to a second aspect of the present invention, the charging method of a lithium ion secondary battery is a charging method of a lithium ion secondary battery that comprises at least a positive electrode, a negative electrode that is provided with a negative electrode active material layer that contains carbon as a negative electrode active material, an electrolytic solution, and a sheathing material that encapsulates the positive electrode, the negative electrode and the electrolytic solution; wherein the negative electrode active material layer contains carboxymethyl cellulose and the electrolytic solution contains an additive that can be decomposed at a predetermined voltage; the charging method comprising: preliminary charging that includes constant-current charging in which charging is carried out at a fixed current and constant-voltage charging that follows the constant-current charging and in which charging is carried out at a fixed voltage; degassing that extracts gas from the interior of the sheathing material following the preliminary charging; and main charging step of charging the lithium ion secondary battery after the degassing, wherein charging capacity per unit mass of the negative electrode active material in the preliminary charging is at least 17 mAh/g.

According to a third aspect of the present invention, a lithium ion battery is charged by the above-described charging method in the process of manufacturing the lithium ion secondary battery.

According to a fourth aspect of the present invention, a lithium ion secondary battery comprises at least: a positive electrode; a negative electrode that is provided with a negative electrode active material layer that contains carbon as a negative electrode active material; an electrolytic solution; and a sheathing material that encapsulates the positive electrode; negative electrode; and electrolytic solution, wherein the negative electrode active material layer contains carboxymethyl cellulose and the electrolytic solution contains an additive that can be decomposed at a predetermined voltage, and wherein an area of sites on which a precipitate is present on a surface of the negative electrode active material layer after being set in a fully charged state is no greater than 0.5% of an area of the surface of the negative electrode active material layer.

By adopting the above-described charging method, the greater portion of gas that is produced inside the cell of a lithium ion secondary battery stops being produced in the preliminary charging step, lack of uniformity of charging due to the gas constituent in the main charging step can be suppressed to thus suppress the formation of precipitate that hinders the electrode reaction on the negative electrode, and reduction of the battery capacity can be suppressed even after repeated charging and discharging.

MODE FOR CARRYING OUT THE INVENTION

Exemplary embodiments of the present invention will be next described.

As the result of a series of investigations, the inventors discovered that, in the manufacture of a lithium ion secondary battery that uses an aqueous binder as the negative electrode active material layer, implementing an initial charging method under fixed conditions, in particular, setting the voltage in the preliminary charging step to 3.3 V or more or setting the charging capacity per unit negative electrode active material to 17 mAh/g or more in the preliminary charging step enables the suppression of the formation of a precipitate that hinders the electrode reaction of the negative electrode on the negative electrode active material layer, and further, obtains a lithium ion secondary battery that suffers little reduction of battery capacity despite repeated charging and discharging.

According to further investigations by the inventors, it became clear that when an aqueous binder is used, the effect of the preliminary charging voltage becomes far more conspicuous when there is a large proportion of the negative electrode active material in the negative electrode active material layer or when material having a large specific surface area is used as the simple substance carbon used as the negative electrode active material.

Although still unclear, the primary factor for these phenomena can be surmised as described below. In the preliminary charging step in which a protective film has still not formed or is still being formed, the decomposition of an additive or electrolyte is in progress on the surface of the negative electrode active material layer, and in the case of a negative electrode having the characteristics of the active material ratio or specific surface area described above, the active material surface that is exposed on the surface is relatively large, and the decomposition reaction therefore progresses rapidly, in line with conventional expectations. When an additive or electrolyte undergoes reduction decomposition at this time, consumption of the lithium that is already contained in the negative electrode active material is believed to occur. Because a material having a decomposition voltage lower than that of an electrolyte is selected as the additive, the decomposition reaction of additive X is represented by:

where the additive is represented by X. In other words, lithium is separated from the negative electrode by the reduction decomposition of the additive. When the electrode potential of the positive electrode and the electrode potential of the negative electrode are considered as single electrode potential, although the electrode potential of the positive electrode does not change, the electrode potential of the negative electrode rises due to the separation of the lithium.

Figure 1A:
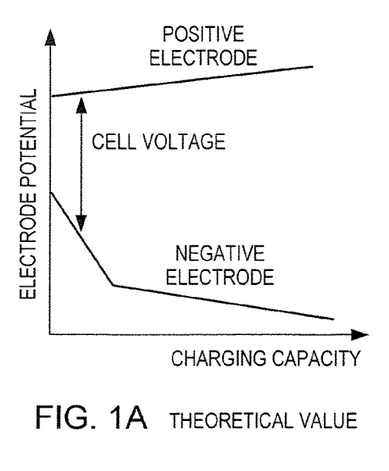
FIG. 1A and FIG. 1B are graphs showing the relation between the charging capacity and the electrode potentials.
Figure 1B:
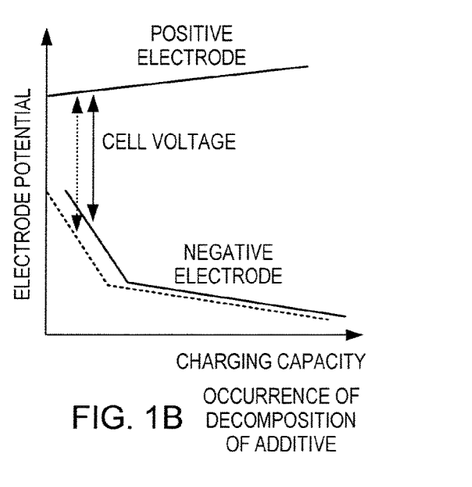

FIGS. 1A and 1B are both graphs showing the relation between charging capacity and the electrode potentials of the positive electrode and negative electrode in a lithium ion secondary battery. The cell voltage at this time corresponds to the difference between the electrode potentials of the positive electrode and negative electrode as shown by the arrows in the figures. When reduction decomposition of an additive does not occur, the electrode potentials of the positive electrode and negative electrode theoretically change as shown in FIG. 1A with respect to the charging capacity. The difference between the electrode potentials of the positive electrode and negative electrode is the cell voltage. In contrast, when lithium is separated from the negative electrode due to, for example, the reduction decomposition of an additive, only the negative electrode shifts toward the side of higher electrode potential, as shown by the solid line in FIG. 1B. As a result, a higher cell voltage is necessary to attain the desired negative electrode potential for forming a stable SEI film without the occurrence of a precipitate. The reduction decomposition of an additive or electrolytic solution occurs more readily in the preliminary charging step in a lithium ion secondary battery that uses an aqueous binder than when PVDF is used as the binder, and the need to increase the set voltage in the preliminary charging step is believed to arise due to this factor.

Figure 2:
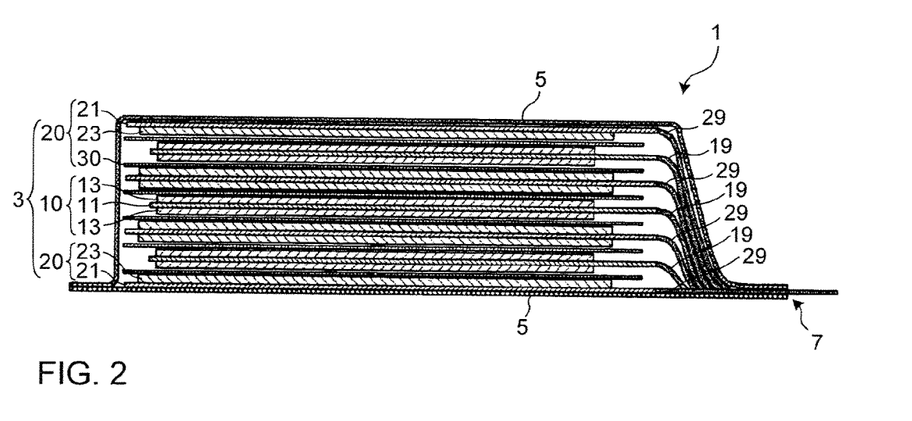
FIG. 2 is a schematic sectional view showing the configuration of one example of a lithium ion secondary battery to which the charging method of an exemplary embodiment of the present invention has been applied.

FIG. 2 shows an example of a lithium ion secondary battery in which the charging method according to the exemplary embodiment of the present invention is applied. In this lithium ion secondary battery 1, battery element 3 having a laminated construction in which positive electrode sheets 10 and negative electrode sheets 20 are stacked with interposed separators 30 is sealed by film-form sheathing material 5. In positive electrode sheet 10, positive electrode active material layer 13 is formed over positive electrode collector 11 composed of, for example, aluminum foil. In addition, negative electrode active material layer 23 is formed over negative electrode collector 21 that is composed of, for example, copper foil in negative electrode sheet 20 that has greater surface area than positive electrode sheet 10.

For each of positive electrode lead-out terminals 19 and negative electrode lead-out terminals 29, heat sealing is carried out at seal opening 7 of sheathing material 5 and the lead-out terminals are led out to the outside. The interior is filled with electrolytic solution, and then the opening sealed under a reduced-pressure condition. Due to the pressure difference between outside and inside realized by the reduced-pressure condition, sheathing material 5 is presses against battery elements 3 in which positive electrode sheets 10 and negative electrode sheets 20 are laminated.

In the present exemplary embodiment, lithium cobalt oxide, lithium nickel oxide and lithium manganese oxide, which are lithium-containing transition-metal oxides, can be used for the positive electrode active material that is contained in positive electrode active material layer 13.

As the lithium cobalt oxide, typical $LiCoO_2$ that has a plateau in the vicinity of 4 V can be used when using metal Li as the counter electrode to find charging and discharging characteristics. In addition, a construction can be used in which elements such as Mg, Al and Zr modify the surface or in which these elements substitute or are doped in Co sites in order to improve thermal stability or to prevent instability of the crystal structure when the amount of drawn Li becomes great.

As the lithium nickel oxide, $LiNi_{1-x}Co_xO_2$ (where $0.1 \leq x \leq 0.3$) in which a portion of Ni sites are replaced by Co, or $LiNi_{1-x-y}Co_xAl_yO_2$ (where $0.1 \leq x \leq 0.3$ and $0.02 \leq y \leq 0.1$) in which Al is further doped can be used. In addition to having a plateau in the vicinity of 4 V when metal Li is used as the counter electrode to find charging and discharging characteristics, these oxides can be used to achieve thermal stability and superior cycle characteristics.

As the lithium manganese oxide, $Li_{1+x}Mn_{2-x-y}M_yO_{4-z}$ (where: $0.03 \leq x \leq 0.16$; $0 \leq y \leq 0.1$; $-0.1 \leq z \leq 0.1$; and M is one or more selected from Mg, Al, Ti, Co and Ni) that has a plateau in the vicinity of 4 V when metal Li is used as the counter electrode to find the charging and discharging characteristics can be used. No particular limitations apply to the particle shape of lithium manganese oxide, which may be bulky, spherical, plate-like, or some other form. The grain size and specific surface area can also be appropriately selected with consideration given to the film thickness of the positive electrode active material layer, the electrode density of the positive electrode active material layer, the binder type, and so on. However, in order to keep the energy density high, the particle shape, particle size distribution, average grain size, specific surface area and true density are preferably selected such that the electrode density of the portion of the positive electrode active material layer from which collector metal foil has been removed is 2.8 g/cm³ or more. In addition, the particle shape, particle size distribution, average particle size, specific surface area and true density are preferably selected such that, of the positive electrode mixture that is composed of, for example, positive electrode active material, binder and conductivity-imparting agent, the mass ratio occupied by the positive electrode active material is 80% or more. The method disclosed in, for example, WO2011/061999 [PL6] can be used as the method of synthesizing the $Li_{1+x}Mn_{2-x-y}M_yO_{4-z}$ (where $0.03 \leq x \leq 0.16$, $0 \leq y \leq 0.1$, $-0.1 \leq z \leq 0.1$, and M is one or more metals selected from Mg, Al, Ti, Co, and Ni).

A positive electrode active material that is mixed such that the mass ratio of lithium manganese oxide and lithium nickel oxide are in the range of 90:10 to 50:50 is mixed with a binder species and a conductivity-imparting agent such as acetylene black or carbon to realize the positive electrode mixture. An ordinarily used resin binding agent can be used as the binder, a binder such as polyvinylidene difluoride (PVDF) or polytetrafluoroethylene (PTFE) being usable. This positive electrode mixture is made into slurry and then applied to the collector metal foil by a known method and dried to manufacture the positive electrode. The positive electrode collector metal foil is preferably aluminum foil.

Other than the materials described above, one or more of a ternary material represented by, for example, $Li(Ni_xCo_yMn_z)O_2$ (where $0<x, y, z<0.9$) or a known material such as lithium iron phosphate or lithium manganese phosphate may be mixed and used as the positive electrode active material.

In the present exemplary embodiment, graphite having its surface covered by amorphous carbon is used for the negative electrode active material. To realize the negative electrode mixture, this graphite is mixed with a thickener and aqueous binder species that is appropriately selected according to characteristics such as rate characteristic, output characteristic, low-temperature discharge characteristic, pulse discharge characteristic, energy density, lightness and small size that are of chief importance for batteries. For example, styrene-butadiene copolymer rubber (SBR) is used as the aqueous binder. Carboxymethyl cellulose (CMC) is used as the thickener. The negative electrode mixture is dispersed in water to make slurry, applied to the negative electrode collector metal foil by a known method, and dried to manufacture the negative electrode. The negative electrode collector metal foil is preferably copper foil.

A porous plastic film of polypropylene or a three-layer construction of polypropylene, polyethylene and polypropylene is preferably used as the separator. No particular limitation applies to the thickness of the separator, but taking into consideration the rate characteristic, the energy density of the battery, and mechanical strength, a thickness of from 10 μm to 30 μm is preferable.

A normally used solvent can be used as the solvent of the aprotic electrolytic solution, for example, carbonates, ethers or ketones can be used. A mixture of at least one type selected from ethylene carbonate (EC), propylene carbonate (PC), and γ-butyrolactone (GBL) as a high-dielectric constant solvent and at least one type selected from diethyl carbonate (DEC), dimethyl carbonate (DMC), ethylmethyl carbonate (EMC) and esters as a low-viscosity solvent is preferably used. As a mixed liquid, EC+DEC, EC+EMC, EC+DMC, PC+DEC, PC+EMC, PC+DMC, PC+EC+DEC and so on are preferable. Further, an additive that can be decomposed at a predetermined voltage is added to the solvent of the aprotic electrolytic solution. As the additive, any one or a mixture of two or more additives that satisfy the condition of being able to decompose at a prescribed voltage such as vinylene carbonate, vinylethylene carbonate, fluoroethylene carbonate, difluoroethylene carbonate, propanesulfone, diethylsulfone and other known additives can be used, but a sulfonate ester having at least two sulfonyl groups is preferably used.

Because the negative electrode active material is graphite, when a sulfonate ester having at least two sulfonyl groups is used as an additive, the mixing ratio of PC in the solvent that constitutes the aprotic electrolytic solution is preferably a low ratio of a level such that the additive is reduced before the PC at the time of initial charging and forms a fine film (SEI) on the negative electrode, following which the reduction decomposition reaction of PC itself does not occur. In addition, when the solvent is of low purity or when the water content is high, the mixing ratio of a solvent species having a wide potential window on the high-potential side is preferably increased.

As the supporting electrolyte contained in the aprotic electrolytic solution, at least one type selected from among $LiBF_4$, $LiPF_6$, $LiClO_4$, $LiAsF_6$, $Li(CF_3SO_2)N$, $Li(C_2F_5SO_2)_2N$ and the like can be used, but $LiPF_6$ is preferably used. The concentration of the supporting electrolyte is preferably 0.8 to 1.5 mol/L, and more preferably 0.9 to 1.2 mol/L.

The cyclic sulfonate ester shown by Formula (1) or the chain sulfonate ester shown by Formula (2) is preferable as the sulfonate ester having at least two sulfonyl groups that is contained as an additive in the aprotic electrolytic solution.

(1)

In Formula (1), Q is an oxygen atom, a methylene group or a single bond; Al represents a substituted or unsubstituted alkylene group with 1 to 5 carbon atoms, a carbonyl group, a sulfinyl group, a substituted or unsubstituted fluoroalkylene group with 1 to 6 carbon atoms, or a bivalent group with 2 to 6 carbon atoms to which an alkylene unit or fluoroalkylene unit is bonded by way of an ether bond; and A2 represents a substituted or unsubstituted alkylene group, a substituted or unsubstituted fluoroalkylene group, or an oxygen atom.

(2)

In Formula (2), $R_1$ and $R_4$ each independently represent an atom or group selected from: a hydrogen atom, a substituted or unsubstituted alkyl group with 1 to 5 carbon atoms, a substituted or unsubstituted alkoxy group with 1 to 5 carbon atoms, a substituted or unsubstituted fluoroalkyl group with 1 to 5 carbon atoms, a polyfluoroalkyl group with 1 to 5 carbon atoms, $—SO_2X_1$ (where $X_1$ is a substituted or unsubstituted alkyl group with 1 to 5 carbon atoms), $—SY_1$ (where $Y_1$ is a substituted or unsubstituted alkyl group with 1 to 5 carbon atoms), —COZ (where Z is a hydrogen atom or a substituted or unsubstituted alkyl group with 1 to 5 carbon atoms), and a halogen atom; and R2 and R3 each independently represent an atom or group selected from: a substituted or unsubstituted alkyl group with 1 to 5 carbon atoms, a substituted or unsubstituted alkoxy group with 1 to 5 carbon atoms, a substituted or unsubstituted phenoxy group, a substituted or unsubstituted fluoroalkyl group with 1 to 5 carbon atoms, a polyfluoroalkyl group with 1 to 5 carbon atoms, a substituted or unsubstituted fluoroalkoxy group with 1 to 5 carbon atoms, a polyfluoroalkoxy group with 1 to 5 carbon atoms, a hydroxyl group, a halogen atom, $—NX_2X_3$ (where $X_2$ and $X_3$ are each independently a hydrogen atom or a substituted or unsubstituted alkyl group with 1 to 5 carbon atoms), or $—NY_2CONY_3Y_4$ (where $Y_2$ to $Y_4$ are each independently a hydrogen atom or a substituted or unsubstituted alkyl group with 1 to 5 carbon atoms).

Although actual examples of the representative examples of the cyclic sulfonate ester shown by Formula (1) are shown in Table 1 and actual examples of the representative example of the chain sulfonate ester shown by Formula (2) are shown in Table 2, the present exemplary embodiment is not limited to these examples.

TABLE 1

| Compound No. | Chemical Structure |
|---|---|
| 1 | |
| 2 | |
| 3 | |
| 4 | |
| 5 | |
| 6 | |
| 7 | |
| 8 | |
| 9 | |

TABLE 1-continued

| Compound No. | Chemical Structure |
|---|---|
| 10 | (structure) |
| 11 | (structure) |
| 12 | (structure) |
| 13 | (structure) |
| 14 | (structure) |
| 15 | (structure) |
| 16 | (structure) |
| 17 | (structure) |
| 18 | (structure) |
| 19 | (structure) |
| 20 | (structure) |
| 21 | (structure) |
| 22 | (structure) |

TABLE 2

| Compound No. | Chemical Structure |
|---|---|
| 101 | (structure) |
| 102 | (structure) |
| 103 | (structure) |
| 104 | (structure) |

TABLE 2-continued

| Compound No. | Chemical Structure |
|---|---|
| 105 | (CH₃)₂C(SO₂OCH₃)₂ |
| 106 | CH₃SO₂CH(SO₂OCH₂CH₂CH₃) — methylsulfonyl / propoxysulfonyl methane |
| 107 | CH₃SO₂CH(SO₂OCH₂CH₂Cl) |
| 108 | H₃CO—CH(SO₂OCH₃)₂ |
| 109 | CF₂(SO₂OCH₃)₂ |
| 110 | HOSO₂CH₂SO₂OCH₃ |
| 111 | ClSO₂CH₂SO₂OCH₂CH₂OH |
| 112 | ClSO₂CH₂SO₂OCH₂CH₂OSO₂CH₂Cl |
| 113 | CH₂(SO₂OCF₂CF₃)₂ |
| 114 | CH₂(SO₂NH₂)₂ |
| 115 | H₂NSO₂CH₂SO₂OC₆H₅ |
| 116 | CH₂(SO₂OC₆H₅)₂ |
| 117 | CH₂(SO₂NHCONH₂)₂ |
| 118 | O=CH—CH(SO₂OH)₂ |
| 119 | CH₃SO₂CH(SO₂OC₆H₅)₂ |
| 120 | CH₃CH₂—S—CH(SO₂OC₆H₅)₂ |

The positive electrode sheets and negative electrodes sheet are laminated or wound with separators interposed and sealed inside a sheathing material composed of laminated film while leaving an electrolytic solution injection portion. Aluminum laminated film is preferable as the laminated film. Aprotic electrolytic solution is injected from the electrolytic solution injection portion, and the laminated film is vacuum-sealed, whereby the pre-preliminary charging lithium ion secondary battery is realized.

The manufactured pre-preliminary charging lithium ion secondary battery is then subjected to preliminary charging by constant-current constant-voltage charging. In constant-current constant-voltage charging, the set voltage in constant-voltage charging is 3.3 V or more. Alternatively, the charging capacity per unit mass of the negative electrode active material in the preliminary charging step is set to 17 mAh/g or more. If the set voltage falls below 3.3 V or if the charging capacity per unit mass of the negative electrode active material falls below 17 mAh/g in the preliminary charging, a large amount of unreacted additive will remain after completion of preliminary charging, and portions in which SEI film has not formed will occur on the negative electrode active material layer. As a result, gas will be generated by the reaction of additive during main charging, precipitate will be produced on the negative electrode active material layer, and the cycle characteristics will be degraded.

In order to discharge gas that is potentially generated in preliminary charging, the laminated film of the lithium ion secondary battery that follows preliminary charging must be opened. Following gas discharge, the laminated film is again vacuum-sealed. Main charging is then carried out to complete the lithium ion secondary battery. The conditions of main charging differ according to the design of the secondary battery being demanded. As an example, constant-current constant-voltage charging can be carried out for 8 hours up to the designed voltage at a current value of 0.25 C.

EXAMPLES

The present invention is next described in greater detail with regard to Examples.

A lithium ion secondary battery was assembled using amorphous carbon coated graphite as the negative electrode active material; initial charging composed of a preliminary charging step, a degassing step, and a main charging step is carried out; following which charging and discharging was repeated to appraise the performance of the lithium ion secondary battery. A plurality of lithium ion secondary batteries were here produced while varying the specifications of the amorphous carbon coated graphite and the amount of binder in the negative electrode active material layer, and further, varying the charging conditions in the preliminary charging step in initial charging to appraise the performance regarding a plurality of samples, i.e., lithium ion secondary batteries. The specific surface area and coverage factor were used as the specifications of the amorphous carbon coated graphite.

[Fabrication of Lithium Ion Secondary Batteries]

As the positive electrode active material, a mixture of lithium manganese oxide and lithium nickel oxide was dry-mixed with a conductivity-imparting agent, and the result was then evenly dispersed in N-methyl-2-pyrrolidone (NMP), in which polyvinylidene difluoride (PVDF), a binder, was dissolved, to produce slurry. The ratio of combination of the mixture that constitutes the positive electrode active material was: lithium manganese oxide:lithium nickel oxide=75:25 (mass percent). This slurry was applied to aluminum metal foil having a thickness of 20 μm and the NMP was then vaporized to form a positive electrode active material layer, thus fabricating a positive electrode sheet. The solid content ratio in the positive electrode active material layer by mass ratio (%) was: lithium manganese oxide:lithium nickel oxide:conductivity-imparting agent: PVDF=68:23:5:4. A portion measuring 70 mm wide and 130 mm long that was a portion in which the positive electrode active material layer was formed and another portion measuring 10 mm wide and 25 mm long that was a region in which slurry was not applied while the surface of the aluminum metal foil was exposed were punched from this positive electrode sheet such that these portions were not separated.

As the negative electrode active material, amorphous carbon coated graphite was evenly dispersed in water together with acetylene black, which is a conductivity-imparting agent, and carboxymethyl cellulose (CMC), which is a thickener, and styrene-butadiene copolymer rubber (SBR), which is a binder, to produce slurry. This slurry was applied onto a copper foil having a thickness of 10 μm, following which the water was vaporized to form a negative electrode active material layer and thus fabricate a negative electrode sheet. The binder used here is known as aqueous binder. The specific surface area and the amorphous coverage factor of the amorphous carbon-coated graphite differed for each sample and were as shown in Table 3, to be described. In Table 3, the specific surface area is a value obtained by the BET method, and the amorphous coverage factor indicates the mass ratio of the amorphous carbon in the graphite surface. Taking advantage of the tendency for amorphous carbon to more readily oxidize and become carbon dioxide at a lower temperature in the atmosphere than graphite, the mass ratio of the amorphous carbon could be found by, for example, measuring the weight reduction rate by thermobalance (TG) at a temperature of 650° C. in the atmosphere. In Table 3, the amorphous coverage factor of Samples 20 and 21 is 0, and this shows that in Samples 20 and 21, graphite used was not covered by amorphous carbon.

The solid content ratio in the negative electrode active material layer by mass ratio was: graphite:acetylene black: thickener:binder=96.5:1:1:1.5. The amount of binder in Table 3 indicates the sum of the thickener and the binder, and the negative electrode active material layer therefore corresponds to samples in which the amount of binder is 2.5% in Table 3. When the amount of binder is varied from 2.5%, the mass ratio of SBR should be changed, and the mass ratio of graphite should be changed to correspondingly without altering the mass ratio (percent) of each of the acetylene black and thickener.

A portion measuring 74 mm wide and 134 mm long, which was a portion in which the negative electrode active material layer was formed, and another portion measuring 10 mm wide and 25 mm long, which was a region in which the surface of the copper foil was exposed and the slurry was not applied, were punched from the negative electrode sheet that was fabricated in this way such that these portions were not separated.

Fourteen negative electrode sheets and thirteen positive electrode sheets that were fabricated in this way were stacked with porous film separators made from polypropylene 25 μm thick interposed to fabricate a laminated structure that is the battery element. The laminated structure was here fabricated such that the exposed metal foil portions of each of the positive electrode sheets and the exposed metal foil portions of each of the negative electrode sheets were on the same side, respectively. An outer aluminum current lead-out tab was ultrasonic welded to the positive electrode sheets of the laminated body, and an outer nickel current lead-out tab was ultrasonic welded to the negative electrode sheets. An embossed laminated film in conformity to the shape of the laminated structure and a flat laminated film were heat-sealed so as to encapsulate the obtained laminated structure while leaving an electrolytic solution injection portion. These laminated films form the sheathing material.

As an aprotic electrolytic solution, an electrolytic solution was prepared that takes 1 mol/L of $LiPF_6$ as a supporting electrolyte and that takes as the solvent a liquid mixture in which ethylenecarbonate (EC) and diethylcarbonate (DEC) were mixed such that the volume ratio was EC:DEC=30:70. As a cyclic sulfonate ester having at least two sulfonyl groups, a compound indicated by the following Formula (3) was mixed as an additive into this electrolytic solution at a 1.6 wt % with respect to the electrolytic solution. This electrolytic solution was injected from the electrolytic solution injection portion and the laminated film was then vacuum-sealed, thereby realizing assembly of the lithium ion secondary battery. Because the lithium ion secondary battery is not subjected to initial charging in this state, this construction is referred to as a pre-preliminary charging lithium ion secondary battery.

each sample is shown in the charging voltage column in Table 3. After the preliminary charging, the laminated film was temporarily opened and gas that accumulated inside the battery was eliminated, following which the laminate film was again vacuum-sealed. After the vacuum-sealing, constant-current constant-voltage charging was carried out as the main charging for ten hours at 0.2 C until 4.2 V was attained. Subsequently, after aging for one week in a thermostatic oven at 38° C., constant-current discharging was carried out under conditions of 25±4° C. and a current value of 0.2 C until 3.0 V was attained, whereby fabrication of the lithium ion secondary battery was completed.

Three lithium ion secondary batteries of this type were fabricated for each sample.

[Appraisal]

The fabricated lithium ion secondary batteries were appraised regarding the preliminary charging capacity, precipitate area ratio, capacity maintenance factor after cycle testing, and peel strength. The results are shown in Table 3.

TABLE 3

| Sample | Charging Voltage [V] | Specific Surface Area [m$^2$/g] | Amorphous Carbon Coverage Factor [%] | Binder Amount [%] | Preliminary charging Capacity [mAh/g] | Precipitate Area Ratio [%] | Capacity maintenance factor [%] | Peel Strength | Judgment |
|---|---|---|---|---|---|---|---|---|---|
| 1 | 3.0 | 2.4 | 3.0 | 2.5 | 10.2 | 1.5 | 67.1 | | X |
| 2 | 3.2 | 2.4 | 3.0 | 2.5 | 14.1 | 0.8 | 77.6 | | X |
| 3 | 3.3 | 2.4 | 3.0 | 2.5 | 17.2 | 0.3 | 78.7 | | ◯ |
| 4 | 3.4 | 2.4 | 3.0 | 2.5 | 21.1 | none | 81.8 | | ◯ |
| 5 | 3.6 | 2.4 | 3.0 | 2.5 | 26.3 | none | 81.1 | | ◯ |
| 6 | 3.8 | 2.4 | 3.0 | 2.5 | 43 | none | 82.5 | | ◯ |
| 7 | 4.0 | 2.4 | 3.0 | 2.5 | 108 | 0.7 | 72.6 | | X |
| 8 | 3.4 | 5.1 | 3.0 | 2.5 | 23.5 | none | 81.1 | | ◯ |
| 9 | 3.2 | 5.1 | 3.0 | 2.5 | 15.8 | 0.9 | 74.8 | | X |
| 10 | 3.4 | 1.6 | 3.0 | 2.5 | 20.7 | none | 83.9 | | ◯ |
| 11 | 3.2 | 1.6 | 3.0 | 2.5 | 11.7 | 0.6 | 75.5 | | X |
| 12 | 3.4 | 1.2 | 3.0 | 2.5 | 18.6 | none | 82.5 | low | X |
| 13 | 3.2 | 1.2 | 3.0 | 2.5 | 11.1 | 0.6 | 78.3 | low | X |
| 14 | 3.4 | 2.4 | 3.0 | 3.5 | 19.1 | none | 80.4 | | ◯ |
| 15 | 3.2 | 2.4 | 3.0 | 3.5 | 13.7 | 0.9 | 75.5 | | X |
| 16 | 3.4 | 2.4 | 3.0 | 4.0 | 16.7 | 0.1 | 76.3 | | X |
| 17 | 3.2 | 2.4 | 3.0 | 4.0 | 10.6 | 1.2 | 71.0 | | X |
| 18 | 3.4 | 2.4 | 0.2 | 2.5 | 19.8 | none | 80.4 | | ◯ |
| 19 | 3.2 | 2.4 | 0.2 | 2.5 | 13.1 | 0.9 | 72.0 | | X |
| 20 | 3.4 | 2.4 | 0 | 2.5 | 15.8 | 0.2 | 75.5 | | X |
| 21 | 3.2 | 2.4 | 0 | 2.5 | 10.3 | 1.2 | 70.6 | | X |
| 22 | 3.4 | 2.4 | 7.0 | 2.5 | 22.7 | none | 83.9 | | ◯ |
| 23 | 3.2 | 2.4 | 7.0 | 2.5 | 15.3 | 0.9 | 77.6 | | X |
| 24 | 3.4 | 2.4 | 9.0 | 2.5 | 23.3 | 0.1 | 85.3 | low | X |
| 25 | 3.2 | 2.4 | 9.0 | 2.5 | 16.0 | 0.6 | 77.9 | low | X |

(3)

The additive shown in Formula (3) can be decomposed at a prescribed voltage in an aprotic electrolytic solution.

[Charging Conditions]

The fabricated pre-preliminary charging lithium ion secondary battery was subjected to constant-current charging at a current value of 0.1 C under conditions of 25±4° C. until the terminal voltage per cell reached the set voltage, following which preliminary charging was carried out for one hour by means of constant-current constant-voltage charging in which constant-voltage charging is carried out that maintains the set voltage. The set voltage that was used for The preliminary charging capacity shows how much charging of capacity was achieved per unit mass of negative electrode active material in the preliminary charging step.

The precipitate area ratio indicates the proportion of the surface of the negative electrode active material layer that is occupied by portions in which precipitate exists that can interfere with the electrode reaction at the negative electrode. The precipitate ratio was obtained by observing the negative electrode surface. Because this type of precipitate exhibits, for example, a white or yellow color and, in contrast, the negative electrode active material layer itself exhibits a black color due to the carbon that is the negative electrode active material, the precipitate area ratio could be found by subjecting an image taken of the negative electrode surface to image processing. Observation of the negative electrode surface for one lithium ion secondary battery of each sample was realized by opening the package in an inert gas atmosphere and then removing and photographing the above-described negative electrode sheet.

The cycle test was carried out by subjecting two lithium ion secondary batteries of each sample to 500 cycles, each cycle composed of constant-current constant-voltage charging for 2.5 hours at a current value of 1 C in an environment of 40° C. until reaching 4.2 V and then constant-current discharging at a current value of 1 C until reaching 3.0 V. The capacity maintenance factor was then calculated by dividing the discharge capacity of the 500$^{th}$ cycle by the discharge capacity of the tenth cycle.

The peel strength was appraised by preparing one sheet for each sample by a process similar to the negative electrode sheet fabrication in which negative electrode active material layer was applied to only one surface, dried, and then submitted to a peel test. In the peel test, 180° peeling was carried out by a form that conforms to JIS-K6854-2. Samples having peel strength no greater than a fixed value were judged to be "low."

Samples having a residual capacity rate of 78% or more and that were able to maintain peel strength on the negative electrode were rated as "good-quality articles." In Table 3, good-quality articles are marked with a circle "○" in the "Judgment column," and articles that did not meet this standard are marked with "X."

As can be seen from Table 3, in order to be rated as a good-quality article, the set voltage per unit cell in the preliminary charging step, i.e., the charge voltage in Table 3, must be 3.3 V or more, or the charge capacity per unit of negative electrode active material must be 17 mAh/g or more in the preliminary charging step. In cases in which a PVDF binder was used, it is known that when the set voltage surpasses 3.5 V in the preliminary charging step and cycles of charging and discharging are repeated, intercalation of the lithium ions to the negative electrode proceeds under the condition that the gas generated at the negative electrode remains, whereby the capacity maintenance factor decreases after repeated charging and discharging. In contrast, as can be seen from Table 3, when an aqueous binder is used, there is no decrease of the capacity maintenance factor even when the set voltage surpasses 3.5 V.

Based on Table 3, it can be seen that the specific surface area of the negative electrode active material as measured by the BET method is preferably 1.6 m$^2$/g or more, and the amount of binder in the negative electrode active material layer is preferably less than 4.0 mass %; or in other words, the negative electrode active material layer preferably contains 95.5 mass percent or more of simple substance carbon. The simple substance carbon referred to here is amorphous carbon coated graphite and acetylene black. From Table 3, it can further be seen that the amorphous carbon coverage factor in the amorphous carbon coated graphite is preferably in the range of 0.2 to 7%.

Figure 3:
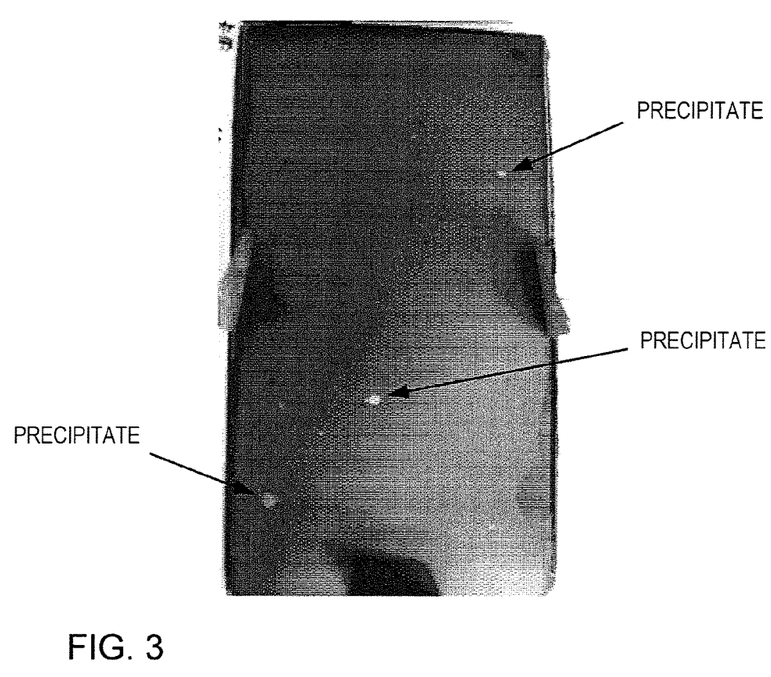
FIG. 3 is a photograph substituted for a drawing showing a negative electrode in which a precipitate has formed on the surface.

Regarding precipitate that is present on the negative electrode active material layer and that can interfere with the electrode reaction on the negative electrode, from Table 3 it can be seen that, with the exception of cases of extremely high voltages such as 4 V, a low set voltage in the preliminary charging step tends to result in more precipitate. It can be seen that in order to obtain adequate battery characteristics, the precipitate area ratio is preferably no greater than 0.5%. FIG. 3 shows precipitate that is found on the negative electrode active material layer of the lithium ion secondary battery of Sample 2 shown in Table 3.

Although the present invention has been described hereinabove with reference to exemplary embodiments and examples, the present invention is not limited to the above-described exemplary embodiments and examples. The configuration and details of the present invention are open to various modifications within the scope of the present invention that will be clear to one of ordinary skill in the art.

This application claims the benefits of priority based on Japanese Patent Application No. 2013-051873 filed on Mar. 14, 2013 and incorporates here by reference all of the disclosures of that application.

REFERENCE SIGN LIST

1 lithium ion secondary battery;
3 battery element;
5 sheathing material;
7 seal opening;
10 positive electrode sheet;
11 positive electrode collector;
13 positive electrode active material layer;
19 positive electrode lead-out terminal;
20 negative electrode sheet;
21 negative electrode collector;
23 negative electrode active material layer;
29 negative electrode lead-out terminal;
30 separator.

The invention claimed is:

1. A charging method of a lithium ion secondary battery that comprises at least a positive electrode, a negative electrode that is provided with a negative electrode active material layer that contains carbon as a negative electrode active material, an electrolytic solution, and a sheathing material that encapsulates said positive electrode, said negative electrode and said electrolytic solution; wherein said negative electrode active material layer contains carboxymethyl cellulose and said electrolytic solution contains an additive that can be decomposed at a predetermined voltage; the charging method comprising:
preliminary charging that includes constant-current charging in which charging is carried out at a fixed current and, following the constant-current charging, constant-voltage charging in which charging is carried out at a fixed voltage;
degassing that extracts gas from an interior of said sheathing material following said preliminary charging; and
main charging that charges said lithium ion secondary battery after said degassing,
wherein said fixed voltage in said constant-voltage charging is at least 3.3 V per cell.

2. The charging method as set forth in claim 1, wherein charging capacity per unit mass of said negative electrode active material in said preliminary charging is 17 mAh/g or more.

3. The charging method as set forth in claim 1, wherein specific surface area of said negative electrode active material is 1.6 m$^2$/g or more.

4. The charging method as set forth in claim 1, wherein said negative electrode active material layer contains 95.5 mass percent or more of simple substance carbon.

5. The charging method as set forth in claim 1, wherein a surface of said negative electrode active material is covered by 0.2 to 7 parts by mass of amorphous carbon with respect to 100 parts by mass of said negative electrode active material.

6. The charging method as set forth in claim 1, wherein an area of sites in which precipitate is present on a surface of said negative electrode active material layer is no greater than 0.5% with respect to an area of the surface of said negative electrode active material layer at the time of completion of said main charging.

7. The charging method as set forth in claim 2, wherein specific surface area of said negative electrode active material is 1.6 m$^2$/g or more.

8. The charging method as set forth in claim 2, wherein said negative electrode active material layer contains 95.5 mass percent or more of simple substance carbon.

9. The charging method as set forth in claim 2, wherein a surface of said negative electrode active material is covered by 0.2 to 7 parts by mass of amorphous carbon with respect to 100 parts by mass of said negative electrode active material.

10. The charging method as set forth in claim 2, wherein an area of sites in which precipitate is present on a surface of said negative electrode active material layer is no greater than 0.5% with respect to an area of the surface of said negative electrode active material layer at the time of completion of said main charging.

11. A charging method of a lithium ion secondary battery that comprises at least a positive electrode, a negative electrode that is provided with a negative electrode active material layer that contains carbon as a negative electrode active material, an electrolytic solution, and a sheathing material that encapsulates said positive electrode, said negative electrode and said electrolytic solution; wherein said negative electrode active material layer contains carboxymethyl cellulose and said electrolytic solution contains an additive that can be decomposed at a predetermined voltage; the charging method comprising:
   preliminary charging that includes constant-current charging in which charging is carried out at a fixed current and, following the constant-current charging, constant-voltage charging in which charging is carried out at a fixed voltage;
   degassing that extracts gas from an interior of said sheathing material following said preliminary charging; and
   main charging that charges said lithium ion secondary battery after said degassing,
   wherein charging capacity per unit mass of said negative electrode active material in said preliminary charging is at least 17 mAh/g.

12. The charging method as set forth in claim 11, wherein specific surface area of said negative electrode active material is 1.6 m$^2$/g or more.

13. The charging method as set forth in claim 11, wherein said negative electrode active material layer contains 95.5 mass percent or more of simple substance carbon.

14. The charging method as set forth in claim 11, wherein a surface of said negative electrode active material is covered by 0.2 to 7 parts by mass of amorphous carbon with respect to 100 parts by mass of said negative electrode active material.

15. The charging method as set forth in claim 11, wherein an area of sites in which precipitate is present on a surface of said negative electrode active material layer is no greater than 0.5% with respect to an area of the surface of said negative electrode active material layer at the time of completion of said main charging.

16. A lithium ion secondary battery comprising at least:
   a positive electrode;
   a negative electrode that is provided with a negative electrode active material layer that contains carbon as a negative electrode active material;
   an electrolytic solution; and
   a sheathing material that encapsulates said positive electrode, said negative electrode and said electrolytic solution,
   wherein said negative electrode active material layer contains carboxymethyl cellulose and said electrolytic solution contains an additive that can be decomposed at a predetermined voltage, and
      wherein an area of sites on which a precipitate is present on a surface of said negative electrode active material layer after being discharged to 3 V after having been fully charged is no greater than 0.5% of an area of the surface of said negative electrode active material layer,
   wherein the lithium ion secondary battery is charged, in a process of the lithium ion secondary battery, by means of a charging method comprising:
      preliminary charging that includes constant-current charging in which charging is carried out at a fixed current and, following the constant-current charging, constant-voltage charging in which charging is carried out at a fixed voltage;
      degassing that extracts gas from an interior of said sheathing material following said preliminary charging; and
      main charging that charges said lithium ion secondary battery after said degassing,
      wherein the preliminary charging satisfies at least one of conditions of (a) said fixed voltage in said constant-voltage charging being at least 3.3 V per cell; and (b) charging capacity per unit mass of said negative electrode active material being at least 17 mAh/g.

* * * * *